W. W. JOHNSON.
AGRICULTURAL IMPLEMENT.
APPLICATION FILED MAY 16, 1911.
1,037,178.
Patented Aug. 27, 1912.
2 SHEETS—SHEET 2.
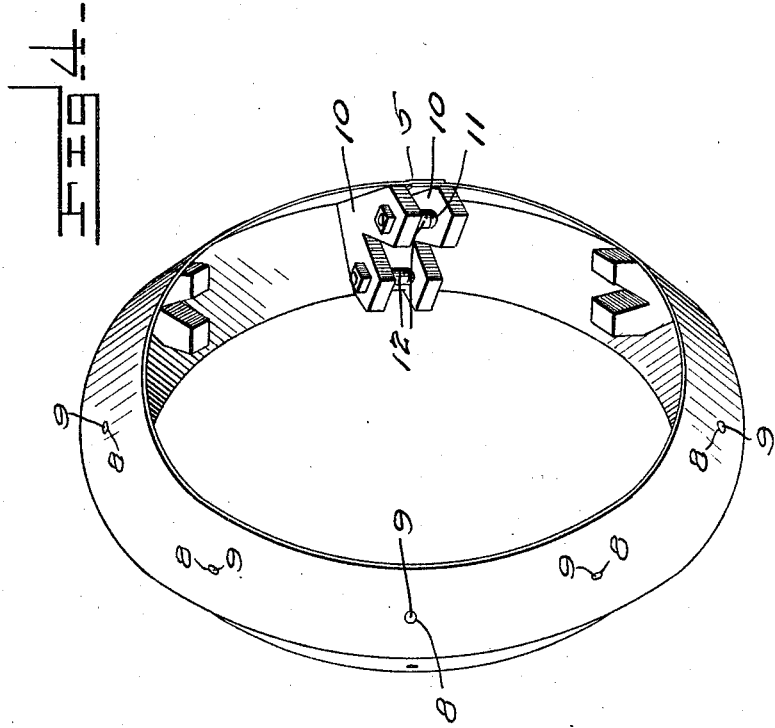
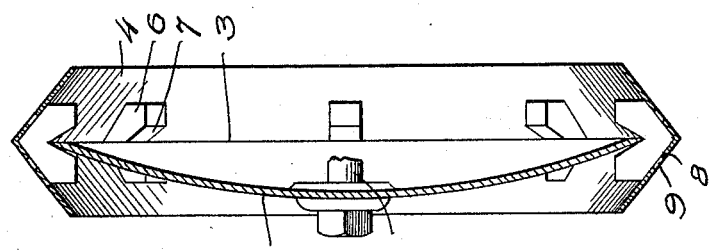
Witnesses
Inventor
W. W. Johnson,
By Harry Ellis Chandler
Attorney

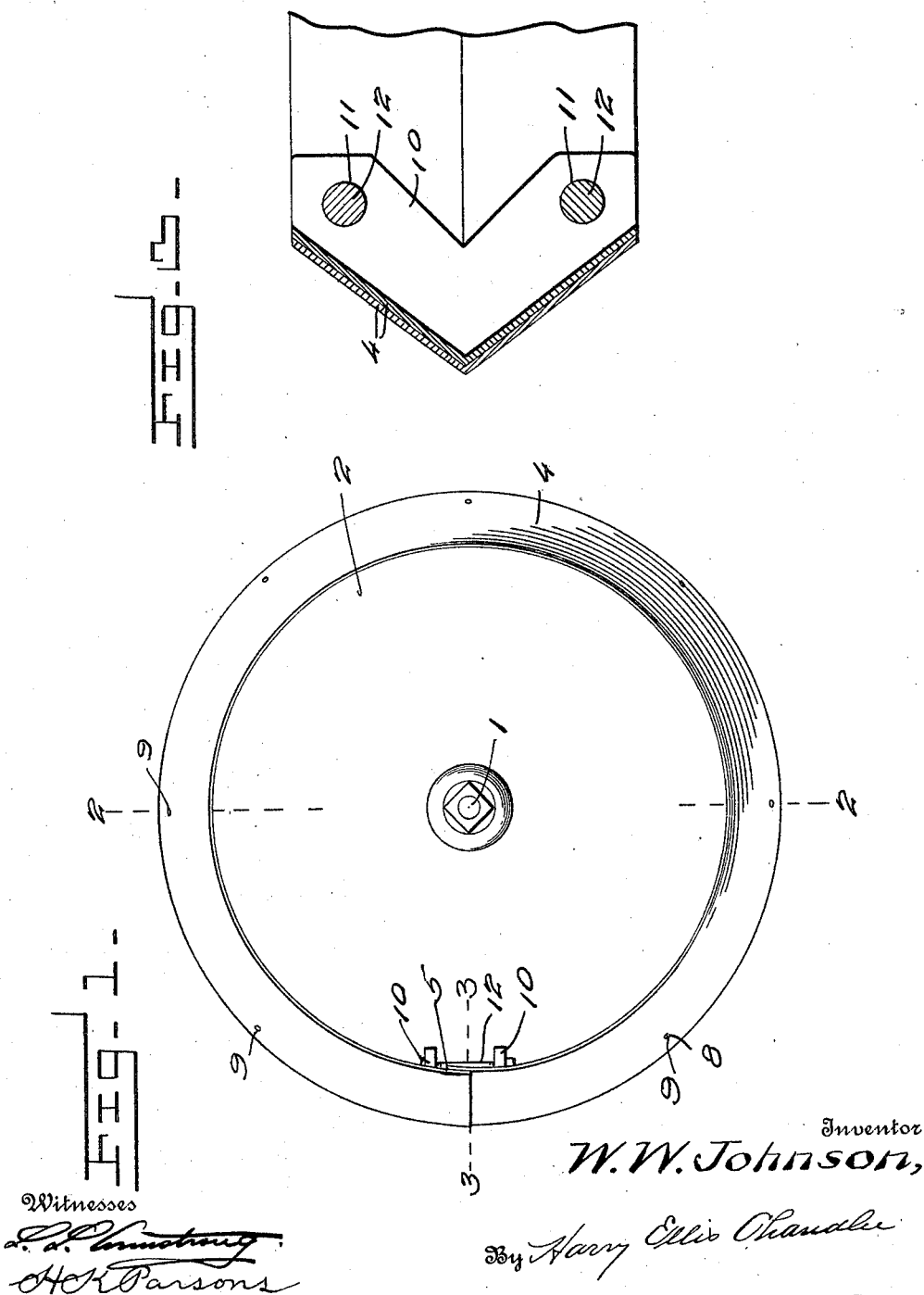

UNITED STATES PATENT OFFICE.

WILLIAM W. JOHNSON, OF REDFIELD, SOUTH DAKOTA, ASSIGNOR TO ELMER G. KASTNER, OF REDFIELD, SOUTH DAKOTA.

AGRICULTURAL IMPLEMENT.

1,037,178.  Specification of Letters Patent.  Patented Aug. 27, 1912.

Application filed May 16, 1911. Serial No. 627,441.

*To all whom it may concern:*

Be it known that I, WILLIAM W. JOHNSON, a citizen of the United States, residing at Redfield, in the county of Spink and State of South Dakota, have invented certain new and useful Improvements in Agricultural Implements, of which the following is a specification.

My invention relates to improvements in agricultural implements, and has for its leading object the provision of an improved land packing attachment which may be readily applied to the blade or cutting wheels of disk plows or harrows.

A further object of my invention is the provision of an improved attachment of this character which may be readily secured in position upon disks of various sizes and which while serving to satisfactorily pack the soil will be so secured upon the disk as to in nowise injure or dull the cutting edge thereof.

Another object of the invention is the provision of an improved attachment which may be readily applied to the common forms of disk plows or harrows and which will readily transform the same into a soil packing machine and will thus save the farmer the expense of buying separate implements to perform the two functions and will also decrease the ground space necessary for the storing of the various agricultural implements.

Other objects and advantages of my improved agricultural implement will be apparent from the following description taken in connection with the drawings, and it will be understood that I may make any changes or modifications in the specific structure shown and described within the scope of the claims without departing from or exceeding the spirit of my invention.

Figure 1 represents a side elevation of a harrow disk equipped with my attachment. Fig. 2 represents a sectional view on the line 2—2 of Fig. 1. Fig. 3 represents an enlarged fragmentary sectional view on the line 3—3 of Fig. 1, and Fig. 4 represents a perspective view of the attachment removed from the disk.

In the drawings, the numeral 1 designates the axle or shaft upon which the harrow disk 2 of customary construction is mounted, said disk having the peripheral cutting edge 3 for engaging and riding on the soil. When it is desired to employ the harrow as a land rolling or packing device to pack the soil at the center of the furrow to cause the moisture to more readily be held therein near the surface while leaving a portion of the soil less heavily packed to form a loam on the surface, I secure on each of the harrow disks my improved attachment. Said attachment comprises an annular band 4 of V-shape in cross section and of greater diameter than the disk over which it is to be secured, whereby there will be a peripheral space between the edge of the disk 2 and the inner face of the band 4. Said band 4 may be formed of either galvanized iron or steel, said substances or materials possessing both the necessary stiffness and springiness or resiliency to permit the band to be bent or adjusted around the disk and secured in position, one end of the band being provided with the offset 5 to overlap the other end of the band, whereby the band will present a complete annular ring capable of adjustment within certain limits to fit varying sizes of disks.

To retain the disk 2 in spaced relation to the band 4 and to protect the edge 3 of the disk 2, I mount in the V of the band 4 a plurality of packing blocks 6 of wood, vulcanized rubber or other suitable material, said blocks being shaped to conform to the V and having the blade engaging grooves 7 formed in their inner faces into which the edge 3 of the disk fits, the blocks thus supporting the parts in their spaced relation and preventing the edge 3 from being dulled against the band. The band preferably has the openings 8 formed therein through which project the lugs or screws 9 which serve to secure the blocks 6 in position.

To clampingly adjust and secure together the two ends of the band 4, I secure interiorly to each end of the band the V-shaped plate 10 having the sockets 11 formed near the upper ends of the arms of the V, said sockets receiving the adjusting screws 12 which connect the arms of the plates of each end of the band on each side of the disk 2, the rotation of said screw members 12 serving to draw the plates 10 together to clampingly secure the band with its blocks against the edge of the disk.

From the foregoing description taken in connection with the drawings, it will be seen that I have provided a simple, efficient and practical attachment for disk harrows which may be readily secured in position and which will serve to firmly pack the soil and will in no wise blunt or damage the edge of the harrow disk to which it is secured.

I claim:

1. The combination with a harrow disk, of a plurality of triangular shaped blocks having grooves formed in one side to engage the edge of the disk, a band of V shape in cross section fitting around the disk and bearing against said blocks, and a screw adjusting device for clampingly securing the band upon the blocks and thus around the periphery of the disk.

2. The combination with a disk having a sharpened edge, of a V shaped band of spring material fitting around the edge of said disk, blocks interposed between the sharpened edge of the disk and the inner face of the band to hold the disk centrally of and spaced from the band, said band having its ends overlapping, and a screw adjusting device for drawing the ends together to clampingly secure the blocks and band on the disk.

3. The combination with a disk having a sharpened edge, of a band of V shape in cross section adapted to fit around the disk, spacing blocks for retaining the edge of the disk out of engagement with the band, said band having overlapping ends, a V shaped plate secured to the band near each end and having sockets formed therein, and a screw adjusting device having one end engaged in one of the sockets of each of said V shaped plates for drawing the plates together to clamp the band around the disk.

In testimony whereof I affix my signature, in the presence of two witnesses.

WILLIAM W. JOHNSON.

Witnesses:
M. MORIARTY,
ELMER G. KASTNER.

---

Copies of this patent may be obtained for five cents each, by addressing the "Commissioner of Patents. Washington, D. C."